(12) United States Patent
Yu et al.

(10) Patent No.: US 7,251,591 B2
(45) Date of Patent: Jul. 31, 2007

(54) CONSISTENT BACK PRESSURE FOR PIEZOELECTRIC INK-JET SIMULATION

(75) Inventors: Jiun-Der Yu, Sunnyvale, CA (US); Shinri Sakai, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 675 days.

(21) Appl. No.: 10/652,386

(22) Filed: Aug. 29, 2003

(65) Prior Publication Data

US 2005/0046649 A1 Mar. 3, 2005

(51) Int. Cl.
 *G06G 7/48* (2006.01)
(52) U.S. Cl. ............... 703/6; 347/61; 347/54; 347/65; 347/55; 347/74; 703/9; 73/861; 73/488; 702/12; 702/100
(58) Field of Classification Search ............... 716/20; 347/18; 216/62; 700/197; 703/9, 2; 702/189
See application file for complete search history.

(56) References Cited

U.S. PATENT DOCUMENTS

| | | | | |
|---|---|---|---|---|
| 4,797,842 | A * | 1/1989 | Nackman et al. ............ 716/20 |
| 5,459,498 | A * | 10/1995 | Seccombe et al. ............ 347/18 |
| 5,657,061 | A * | 8/1997 | Seccombe et al. ............ 347/18 |
| 5,989,445 | A * | 11/1999 | Wise et al. .................. 216/62 |
| 6,161,057 | A * | 12/2000 | Nakano ....................... 700/197 |
| 6,179,402 | B1 | 1/2001 | Suzuki et al. |
| 6,257,143 | B1 | 7/2001 | Iwasaki et al. |
| 6,283,568 | B1 | 9/2001 | Horii et al. |
| 6,315,381 | B1 | 11/2001 | Wade et al. |
| 6,322,186 | B1 | 11/2001 | Shimizu et al. |
| 6,322,193 | B1 | 11/2001 | Lian et al. |
| 2002/0046014 | A1 * | 4/2002 | Kennon ....................... 703/9 |
| 2002/0107676 | A1 * | 8/2002 | Davidson ..................... 703/9 |
| 2002/0177986 | A1 * | 11/2002 | Moeckel et al. ............. 703/9 |
| 2003/0105614 | A1 * | 6/2003 | Langemyr et al. ............ 703/2 |
| 2004/0006450 | A1 * | 1/2004 | Hale ........................... 702/189 |
| 2004/0034514 | A1 * | 2/2004 | Langemyr et al. ............ 703/2 |
| 2005/0114104 | A1 * | 5/2005 | Friedl et al. .................. 703/2 |

OTHER PUBLICATIONS

"Projection Method for Viscous Incompressible Flow on Quadrilateral Grids", John B. Bell, et al., AIAA Journal, vol. 32, No. 10, Oct. 1994, pp. 1961-1969.

"A Second-Order Projection Method for the Incompressible Navier-Stokes Equations", John B. Bell, et al., Journal of Computational Physics, vol. 85, No. 2, Dec. 1989, pp. 257-283.

"Computing Minimal Surfaces via Level Set Curvature Flow", David L. Chopp, Mathematics Department, University of California, Berkeley, California, Journal of Computational Physics 106, pp. 77-91, 1998.

(Continued)

*Primary Examiner*—Fred Ferris
*Assistant Examiner*—Cuong Van Luu

(57) ABSTRACT

A consistent back pressure formulation is introduced into ink-jet simulation models and algorithms to solve an instability problem that occurs as the head of an ink droplet reaches the end of the solution domain during simulation. The consistent back pressure formulation is obtained in a way that is consistent with the idea of interface smearing. Formulas for calculating the pressure boundary condition on quadrilateral grids are disclosed. An ink-jet simulation example is given to demonstrate the improved models and algorithms.

17 Claims, 11 Drawing Sheets

OTHER PUBLICATIONS

"Fronts Propagating with Curvature-Dependent Speed: Algorithms Based on Hamilton-Jacobi Formulations", Stanley Osher, Department of Mathematics, University of California, Los Angeles and James A. Sethian, Department of Mathematics, University of California, Berkeley, California, Journal of Computational Physics 79, pp. 12-49, 1988.

"A Level Set Approach for Computing Solutions to Incompressible Two-Phase Flow", Mark Sussman, et al., Department of Mathematics, University of California, Los Angeles, California, Journal of Computational Physics 114, pp. 146-159, 1994.

"A Projection Method for Incompressible Viscous Flow on Moving Quadrilateral Grids", David P. Trebotich, Department of Mechanical Engineering, University of California, Berkeley, California and Phillip Colella, Applied Numerical Algorithms Group, Lawrence Berkeley National Laboratory, Berkeley, California, Journal of Computational Physics 166, pp. 191-217, 2001.

"A Second-Order Projection Method for Variable-Density Flows", John B. Bell, et al., Lawrence Livermore National Laboratory, Livermore, California, Journal of Computational Physics 101, pp. 334-348, 1992.

* cited by examiner

CONSISTENT BACK PRESSURE FOR PIEZOELECTRIC INK-JET SIMULATION

RELATED APPLICATION DATA

This application is related to the following applications: application Ser. No. 10/105,138, now U.S. Pat. No. 7,085,695, filed on Mar. 22, 2002 and entitled "A Slipping Contact Line Model and the Mass-Conservative Level Set Implementation for Ink-Jet Simulation;" and application Ser. No. 10/390,239, now U.S. Pat. No. 7,117,138, filed on Mar. 14, 2003 and entitled "Coupled Quadrilateral Grid Level Set Scheme for Piezoelectric Ink-Jet Simulation," both filed in the names of the inventors of this application. The disclosures of these related applications are incorporated herein by reference.

BACKGROUND OF THE INVENTION

1. Field of the Invention

The present invention relates to further improvements with respect to models and algorithms to simulate and analyze ink ejection from a piezoelectric print head. More particularly, this invention recognizes and solves an instability that occurs as the head of a droplet reaches the end of the solution domain during simulation. A "consistent back pressure" formulation is introduced into the simulation models and algorithms to eliminate the instability. The improved simulation models and algorithms may be embodied in software, hardware or combination thereof and may be implemented on a computer or other processor-controlled device.

2. Description of the Related Art

Results of computational fluid dynamics (CFD) ink-jet simulation have been very useful in the design of piezoelectric ink-jet print heads. FIG. 1 shows how a practical ink-jet simulation may be carried out. An analytical tool such as an equivalent circuit 11 receives as an input the dynamic voltage to be applied to the piezoelectric PZT actuator and simulates the ink behavior under the influence of the ink cartridge, supply channel, vibration plate, and PZT actuator. That is, from the input voltage and an ink flow rate, the equivalent circuit 11 calculates an inflow pressure that drives the CFD code 12. The CFD code 12 then solves the governing partial differential equations, i.e., the incompressible Navier-Stokes equations for two-phase flows, for fluid velocity, pressure and interface position, and feeds back the ink flow rate to the equivalent circuit. The sequence is repeated as long as needed.

OBJECTS OF THE INVENTION

In related application Ser. No. 10/390,239, we described how to construct a finite difference numerical scheme on quadrilateral grids. The scheme works quite well in general for simulating ink droplet ejections. To evaluate the nozzle performance on continuous droplet ejections, we usually need to run the code for a relatively long period of time (at least 200 µs) to see the ejection of the second, third, and subsequent droplets. To ensure that the code can run well for this time duration, the ejected droplet should be able to go through the end of the solution domain smoothly without causing any stability problem. However, if the interface smearing is tighter than two cells on each side, we experience code instability as the droplet approaches the end of the solution domain.

To illustrate the instability, the ejection of a 13 pico liter droplet is simulated and plotted in FIGS. 2 and 3. The nozzle opening diameter is 25 µm and the solution domain is 31.25 µm×380 µm. A 64×672 quadrilateral mesh (see FIG. 4) is used with the interface smearing $\alpha=2.3$. The initial time step is $8.3333\times10^{-3}$ µs. The simulation goes well until the head of the droplet approaches the end of the solution domain, i.e. when $t=34.83$ µs. At about that time an instability pattern is generated at the head of the droplet. FIG. 3 is a close-up view of the instability at or near the end of the solution domain (in this simulation at $t=34.83$ µs).

Our CFD code features an automatic time step calculation. Upon sensing the instability, the code reduces the time step to overcome the problem. However, usually the instability is so high that the time step is reduced to such an infinitesimally small period (about $1\times10^{-8}$ µs) that the simulation cannot finish in a reasonable period of time. While this problem can be easily solved by setting a larger extent of interface smearing (i.e., much larger than two cells at each side), the larger smearing tends to reduce the effective surface tension and delay the droplet pinch off in simulation.

We have discovered that the instability is caused by the inconsistent pressure boundary condition at the end of the domain. Setting $p=0$, i.e., setting the domain-end pressure equal to the atmospheric pressure, as the outflow boundary condition is true when the droplet is far from there. However, due to droplet surface tension, the boundary pressure should be higher than the atmospheric pressure when the droplet is very close to, or passing through, the end of the solution domain.

It is therefore an object of the present invention to provide a model and accompanying algorithm to simulate and analyze ink droplet ejection that overcomes the instability encountered as the droplet approaches the end of the solution domain.

It is another object of this invention to incorporate a consistent back pressure formulation into such a simulation model and algorithm to solve the instability problem.

SUMMARY OF THE INVENTION

According to one aspect of this invention, a method for simulating and analyzing fluid flow through, and ejection from, a channel is provided. The channel has a boundary between a first fluid that flows through the channel and a second fluid. The method comprises the steps of: (a) performing finite difference analysis including solving, with reference to both a quadrilateral grid in a physical space and a uniform square grid in a computational space, equations governing the flow of the first fluid through the channel, wherein the partial differential equations were first derived for the quadrilateral grid in the physical space and then transformed to the computational space for application on the uniform square grid; and (b) simulating the flow of the first fluid through, and ejection from, the channel based on the performed finite difference analysis. In accordance with the invention, the performing of the finite difference analysis further includes calculating a back pressure boundary condition with reference to the quadrilateral grid to substantially eliminate instability as a head of a droplet of the first fluid approaches the end of the solution domain.

In another embodiment, a method for simulating and analyzing fluid flow through, and ejection from, a channel having a boundary between a first fluid that flows through the channel and a second fluid comprises the steps of: (a)

deriving partial differential equations applicable to a quadrilateral grid in a physical space, including deriving a viscosity term, a surface tension term, and a level set convection equation for two-phase flows; (b) calculating a transformation for transforming the derived partial differential equations for application to a uniform square grid in a computational space; (c) calculating a back pressure boundary condition with reference to the quadrilateral grid to substantially eliminate instability as a head of a droplet of the first fluid approaches the end of the solution domain; and (d) solving the derived and transformed partial differential equations to determine the flow of the first fluid through, and ejection from, the channel. Preferably, in step (d) the derivatives of velocity, pressure, and level set for the flow of the first fluid in the derived and transformed partial differential equations are calculated with reference to the uniform square grid in the computational space.

In another aspect, the invention involves an apparatus for simulating and analyzing fluid flow through, and ejection from, a channel having a boundary between a first fluid that flows through the channel and a second fluid. The apparatus comprises: means for performing finite difference analysis including solving, with reference to both a quadrilateral grid in a physical space and a uniform square grid in a computational space, equations governing the flow of the first fluid through the channel, wherein the partial differential equations were first derived for the quadrilateral grid in the physical space and then transformed to the computational space for application on the uniform square grid; and means for simulating the flow of the first fluid through, and ejection from, the channel based on the performed finite difference analysis. In accordance with the invention, the performing of the finite difference analysis further includes calculating a back pressure boundary condition with reference to the quadrilateral grid to substantially eliminate instability as a head of a droplet of the first fluid approaches the end of the solution domain.

In another embodiment, an apparatus for simulating and analyzing fluid flow through, and ejection from, a channel having a boundary between a first fluid that flows through the channel and a second fluid comprises: means for deriving partial differential equations applicable to a quadrilateral grid in a physical space, including deriving a viscosity term, a surface tension term, and a level set convection equation for two-phase flows; means for calculating a transformation for transforming the derived partial differential equations for application to a uniform square grid in a computational space; means for calculating a back pressure boundary condition with reference to the quadrilateral grid to substantially eliminate instability as a head of a droplet of the first fluid approaches the end of the solution domain; and means for solving the derived and transformed partial differential equations to determine the flow of the first fluid through, and ejection from, the channel.

Preferably, the first fluid is ink, the second fluid is air, and the channel comprises an ink-jet nozzle that is part of a piezoelectric ink-jet head.

In accordance with further aspects of the invention, any of the above-described methods or steps thereof may be embodied in a program of instructions (e.g., software) which may be stored on, or conveyed to, a computer or other processor-controlled device for execution. Alternatively, any of the methods or steps thereof may be implemented using functionally equivalent hardware (e.g., application specific integrated circuit (ASIC), digital signal processing circuitry, etc.) or a combination of software and hardware.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

I. Introduction

Figure 1:
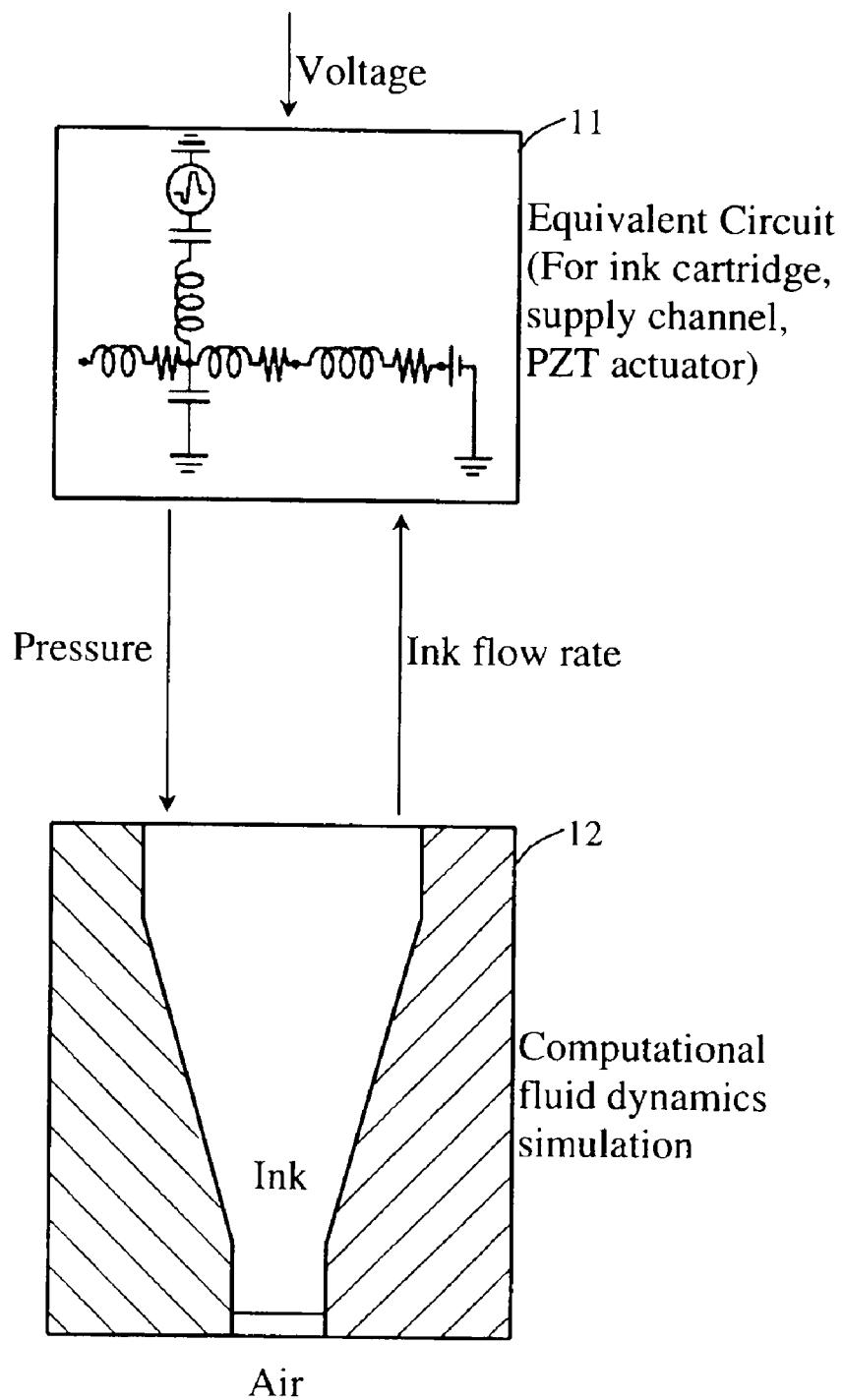
FIG. 1 is a schematic block diagram showing the interrelationship between an equivalent circuit and a computational fluid dynamics simulation according to embodiments of the invention.
Figure 2:
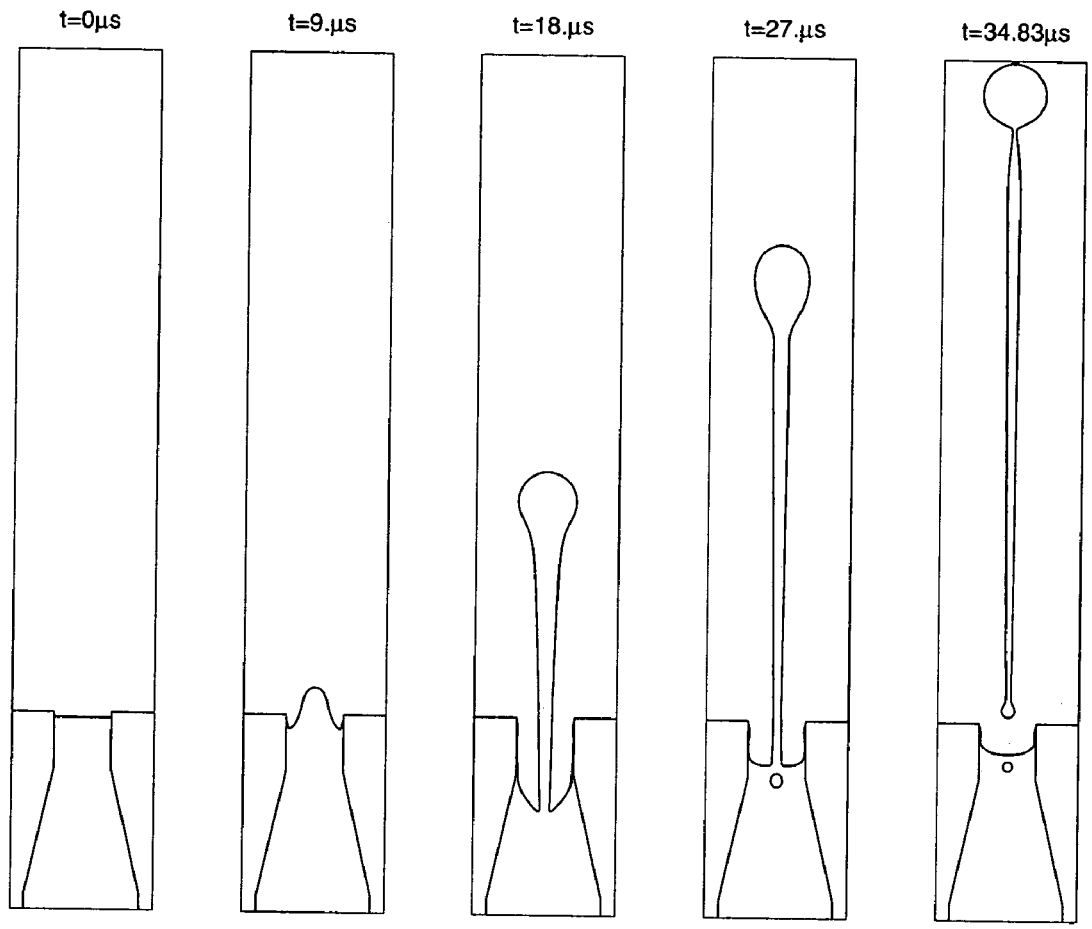
FIG. 2 is a sequence of illustrations depicting an ink droplet ejection simulation in which a problem is encountered as the droplet approaches the end of the solution domain in the last illustration.
Figure 3:
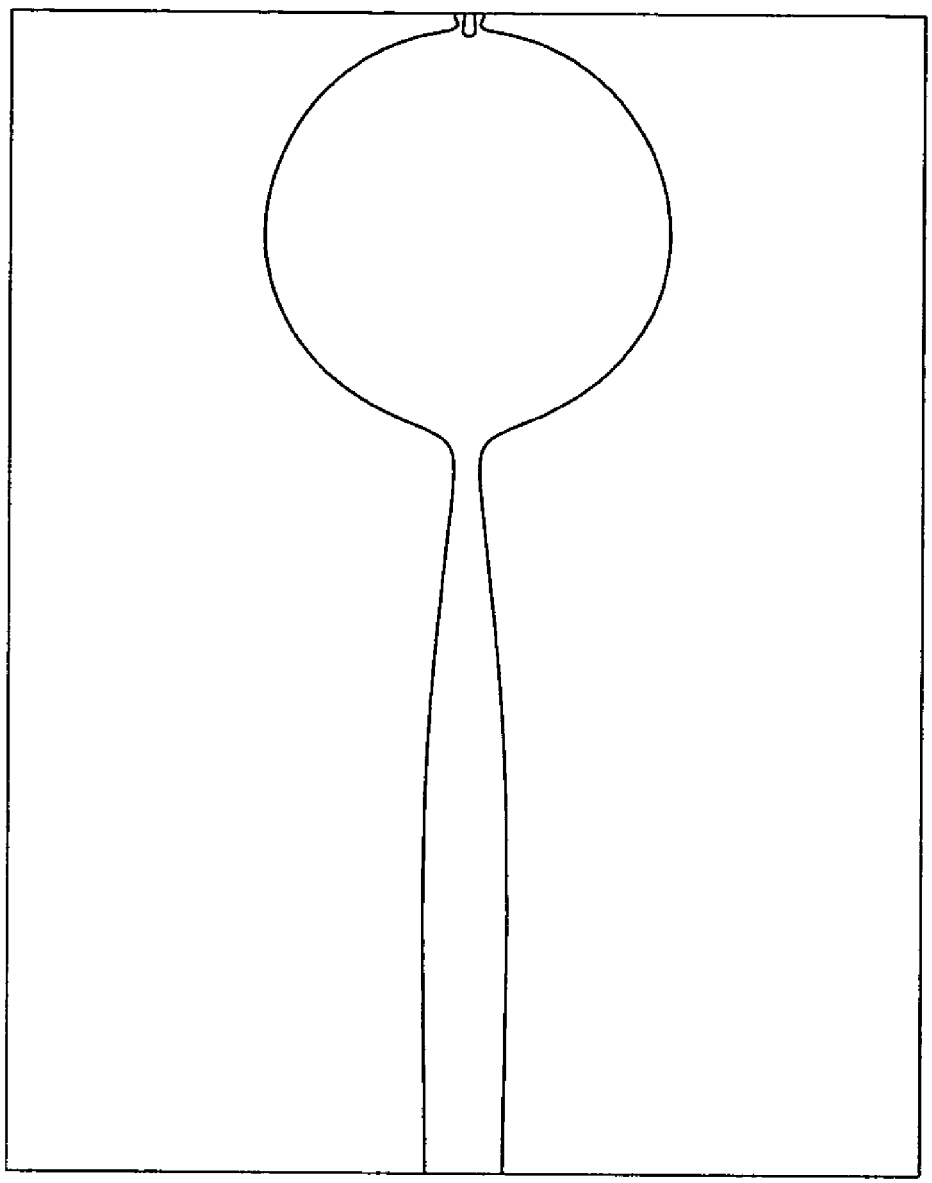
FIG. 3 is a close-up view of the droplet at the end of the solution domain.

The improved models and algorithms of this invention include a consistent back pressure formulation to accommodate the instability encountered as the ink droplet approaches the end of the solution domain. The consistent back pressure formulation is obtained and introduced into the models and algorithms in a way that is consistent with the concept of interface smearing. Formulas for calculating the pressure boundary condition on quadrilateral grids are presented. A simulation example is presented to demonstrate the effect of the improved models and algorithms.

II. Governing Equations

The governing equations for two-phase flows include the continuity equation (1) and the Navier-Stokes equations (2), which are set forth in the Appendix along with the other numbered equations referenced in the following discussion. In these equations, D, as defined in equation (3), is the rate of deformation tensor, $$\frac{D}{Dt} = \frac{\partial}{\partial t} + (u \cdot \nabla)$$

is the Lagrangian time derivative, u the velocity vector, ρ the relative density, p the pressure, μ the relative dynamic viscosity, δ the Dirac delta function, φ the level set, Re the Reynolds number, and We the Weber number. Since the interface moves with the fluid, the evolution of the level set is governed by equation (4).

In this invention, we have adopted the non-dimensional form directly. The detailed definition of the level set and normalization are set forth in related application Ser. No. 10/390,239. The no-slip boundary condition is imposed on the nozzle wall, in conjunction with the slipping contact line model in the vicinity of the triple point, as described in related application Ser. No. 10/105,138. At the inflow (i.e., the bottom of the solution domain), a time-dependent inflow pressure is provided by an equivalent circuit model which mimics the charge-driven mechanism that forces ink from the reservoir into the nozzle. At the outflow (i.e., the top of the solution domain), we set the boundary pressure different from the atmospheric pressure in accordance with the principles of this invention.

III. Temporal Discretization

In the following, the superscript n (or n+1) denotes the time step. Given quantities $u^n$, $p^n$, $\phi^n$, the purpose of the temporal discretization is to obtain $u^{n+1}$, $p^{n+1}$, $\phi^{n+1}$ which approximately satisfy the incompressible Navier-Stokes equations. The temporal discretization described herein is first-order accurate in time. The space discretization algorithm is described in related application Ser. No. 10/390,239.

A. Level Set Update

The level set is updated first by equation (5). The time-centered advection term $[u \cdot \nabla \phi]^{n+1/2}$ is evaluated using an explicit Godunov type scheme that requires only the available data at $t^n$. Once $\phi^{n+1}$ is obtained, we compute $\phi^{n+1/2}$ by equation (6).

B. Explicit Algorithm for Navier-Stokes Equations

An explicit temporal discretization is applied to the viscosity term to save the CPU time that would be spent calculating the inverse of the viscosity term, as mathematically described in equation (7). Using the definition in equation (8), the time-discretized Navier-Stokes equations can be written as set forth in equation (9).

We apply a second-order explicit Godunov scheme for the advection term and the central difference for the viscosity term in equation (8). Thus, the determination of u* needs only values at time step n.

C. Projection for $u^{n+1}$

To satisfy the incompressibility condition for time step n+1 the divergence operator is applied to both sides of equation (9). Since $\nabla \cdot u^{n+1} = 0$, we have projection equation (10) which is elliptic. It reduces to a Poisson's equation if the density ratio $\rho(\phi^{n+1/2})$ is a constant. After the pressure $p^{n+1}$ is solved from equation (10), the velocity field $u^{n+1}$ can be obtained by equation (9).

To make the implementation for arbitrary geometry easier, the finite element projection set forth in equation (11) is used, where ψ is the finite element weighting function, $\Gamma_1$ denotes all of the boundary with inflow or outflow, and $u^{BC}$ is the given boundary velocity. It can be seen by the divergence theory that, if any inflow or outflow velocity is given at $\Gamma_1$, the implied boundary condition there is as set forth in equation (12).

The solution of the projection equation (11) requires adequate pressure boundary conditions. In our ink-jet simulation according to related application Ser. No. 10/390,239, the inflow pressure is given by the equivalent circuit and the outflow pressure is set to be p=0. Since there is no given inflow velocity or outflow velocity, the last term in equation (11) vanishes. As we pointed out, the outflow pressure p=0 causes instability when the ink droplet reaches the end of the solution domain. The consistent back pressure described in the next section solves this problem.

IV. The Consistent Back Pressure

Since the constant pressure outflow boundary condition p=0 causes instability when the droplet approaches or passes through the end of the solution domain, we have to find a new outflow pressure. We start with observations of the flow field at the solution domain end:

1. Setting p=0 at the upper right corner of the solution domain is always reasonable because the droplet radius is much smaller than the width of the solution domain.
2. The pressure gradient is high across the interface because of the surface tension. The radial direction derivative of the pressure far from the interface is negligible.
3. The radial velocity component u is much smaller than the axial component v since the droplet is ejected in the axial direction.

We now describe how to construct the outflow pressure that is consistent with the Navier-Stokes equations (2). Dotting equation (2) with $e_r$ yields equation (13). Since the droplet is traveling in the axial direction, the radial velocity u is usually very small. The time derivative and the nonlinear term at the left hand side can be neglected. This reduces equation (13) to equation (14). Note that we have also multiplied the smeared Dirac delta function in front of the viscosity term because of the second observation above.

Figure 4:
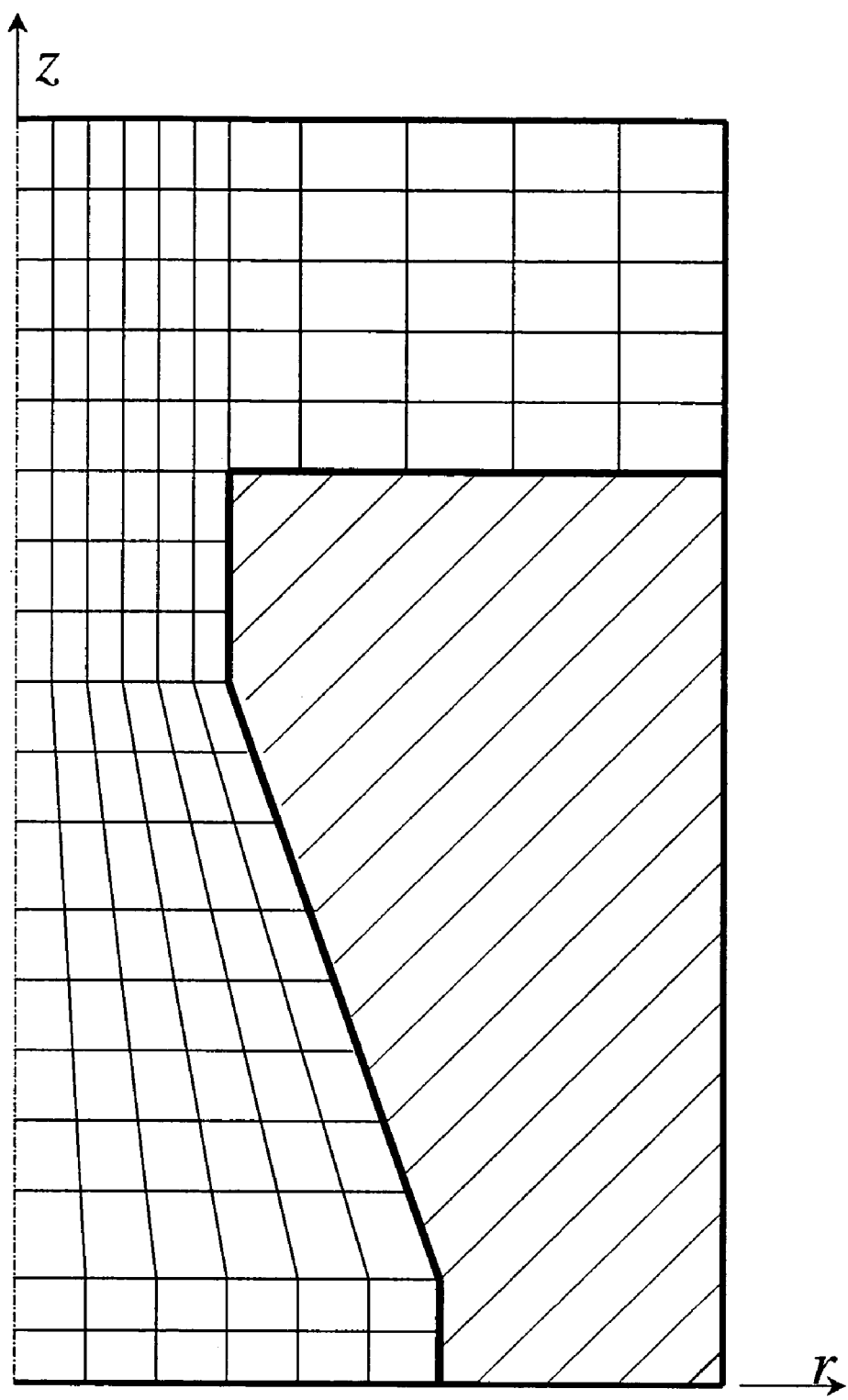
FIG. 4 illustrates a boundary-fitted quadrilateral grid for ink-jet simulation.

Consider the solution domain and grid in FIG. 4. We see that although the grid lines in the nozzle are not necessarily parallel to the coordinate axes, they are parallel to the r and z axes at the end of the solution domain. Hence, the quadrilateral grid is in effect a rectangular grid at the end of the solution domain. Since we would like to show how to obtain the consistent pressure boundary condition at the end of the solution domain, we first assume that the grid system is uniformly rectangular. Using central difference and denoting the field quantity at time step $t^n$ by the superscript $^n$, the discretized relation on uniform square meshes can be written as equation (15), with the discrete form of the radial component of the viscosity term given in equation (16).

The idea and implementation of consistent back pressure, as set forth in equations (14) and (15), can be easily applied to general quadrilateral grids on which the grid lines are not parallel to the coordinate axes even at the outflow. The end of the solution domain is usually taken as parallel to the radial direction. Hence only a slight modification of equation (16) to address the non-uniform mesh size is needed for quadrilateral grids. This equation is given in (17), where the transformation matrix T, Jacobian J, and factor g are defined in the related application Ser. No. 10/390,239. To discretize equation (17), the central difference is used in the computational space.

The numerical algorithm for ink-jet simulation, previously described and illustrated in related application Ser. No. 10/390,239, is shown in the flow diagram of FIG. 5, except that FIG. 5 includes calculation of the consistent back pressure. A flow diagram illustrating the calculation of the consistent back pressure (i.e., step 509 of FIG. 5) in more detail is shown in FIG. 6.

A. Flowcharts

Figure 5:
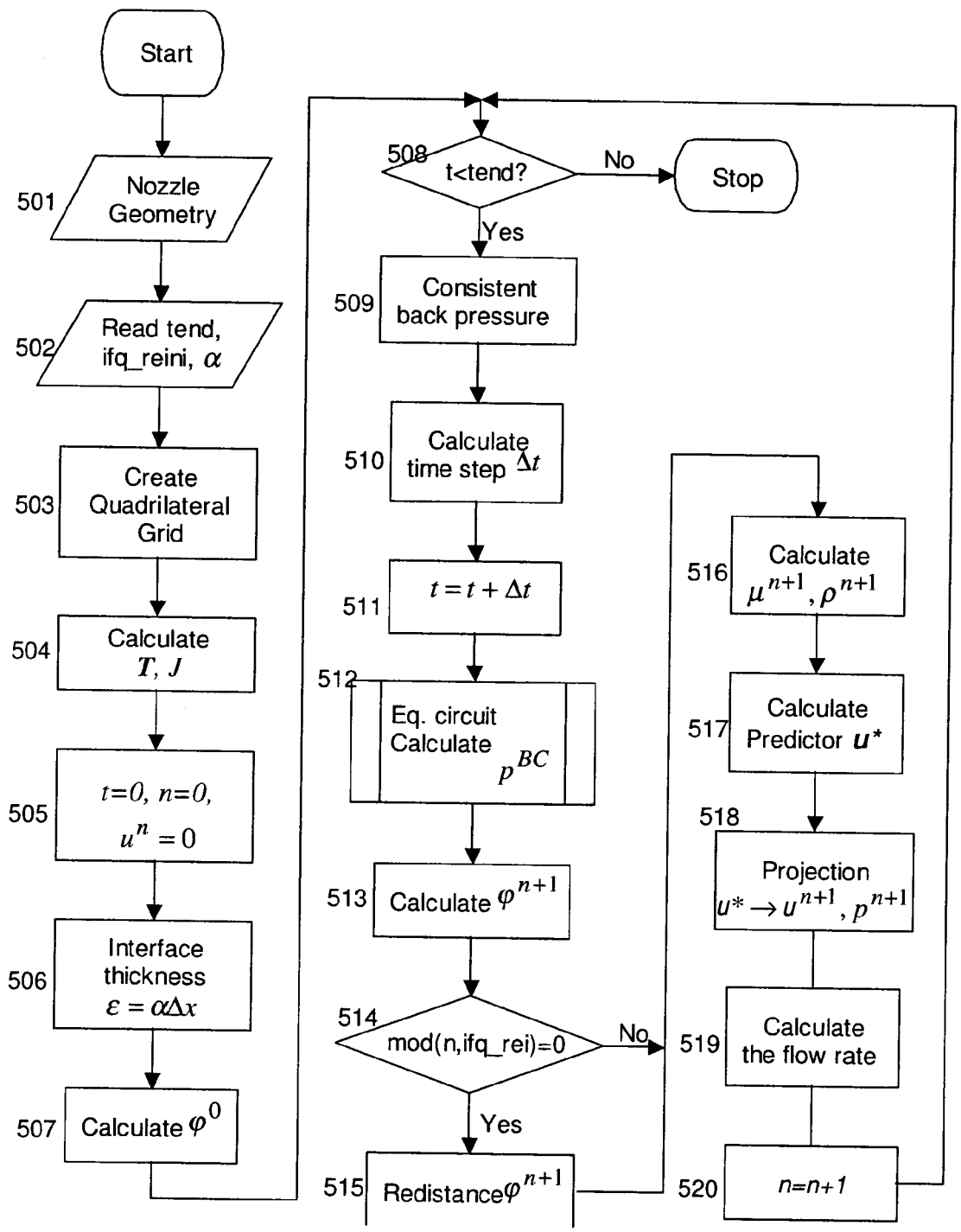
FIG. 5 is a flow diagram illustrating a numerical algorithm according to embodiments of the invention.
Figure 6:
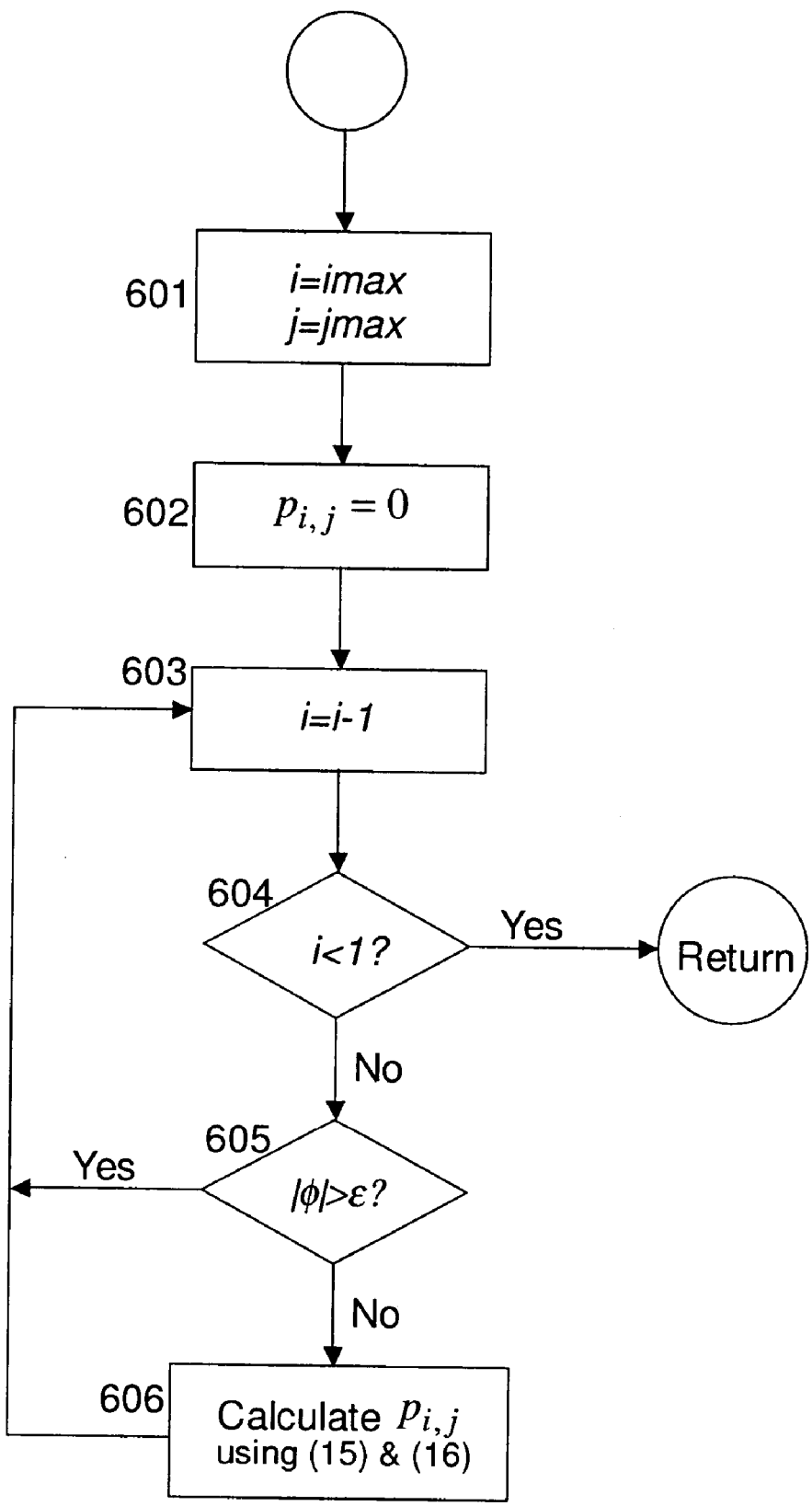
FIG. 6 is a flow diagram illustrating the consistent back pressure calculation portion of the numerical algorithm of FIG. 5.

As shown by the flowchart in FIG. 5, the numerical algorithm is basically sequential. The code first reads the nozzle geometry (step 501) and also reads control parameters like tend (end time of the simulation), α (the extent of interface smearing), ifq_reini (how often the level set should be re-initialized) (step 502). With the given nozzle geometry, the code creates a body-fitted quadrilateral grid as described in related application Ser. No. 10/390,239 (step 503), and calculates the transformation matrix T and the Jacobian J as described in related application Ser. No. 10/390,239 (step 504). The time and the number of the current time step are set to zero and the initial fluid velocity is set to zero everywhere (step 505). With the given smearing parameter (α), the interface thickness is set as described in related application Ser. No. 10/390,239 (step 506). The level set $\phi^0$ is then initialized by assuming the initial ink-air interface is flat (step 507).

Now the time loop starts by checking whether t<tend (step 508). If so, calculation of the consistent back pressure is executed (step 509), just before time step Δt is determined as described in related application Ser. No. 10/390,239 (step 510). The time is updated in step 511. The time step and the ink flow rate (the initial flow rate is zero) are then passed to an equivalent circuit or like analytic tool, which calculates the inflow pressure for the current time step (step 512). After receiving the inflow velocity from the equivalent circuit, the CFD code solves the partial differential equations. The level set is first updated as described in related application Ser. No. 10/390,239 and, for every ifq_reini time steps, is also re-distanced (steps 513, 514, and 515). The new fluid viscosity and density are calculated using the new level set values (step 516). The velocity predictor equation is then calculated (step 517). Finally, the predictor velocity is projected into the divergence-free space to get the new pressure and incompressible velocity fields (step 518). The last things to do in the loop are calculating the ink flow rate (step 519) and updating the number of the time step (step 520).

FIG. 6 illustrates the details of the calculation of the consistent back pressure (step 509 in FIG. 5). In step 601, variables i and j are set to imax and jmax respectively, and $p_{i,j}$ is set equal to zero (step 602). Next, in step 603, i is decremented by 1. Then, it is determined in step 604 if i is less than 1. If so, the program returns to step 601. If not, a determination is made in step 605 as to whether or not |ϕ|>ϵ. If so, the program returns to step 603, where i is again decremented. If not, $p_{i,j}$ is calculated in step 606 using equations (15) and (16).

V. Ink-Jet Simulation

As an example of ink-jet simulation, consider again a typical nozzle as shown in FIG. 1. The diameter is, for example, 25 microns at the opening and 51.4 microns at the bottom. In the illustrated embodiment, the length of the nozzle opening portion (i.e., where the diameter is 25 microns) is 25 microns, the length of tapered section is 55 microns, and the length of the bottom portion is 7.5 microns.

Figure 7:
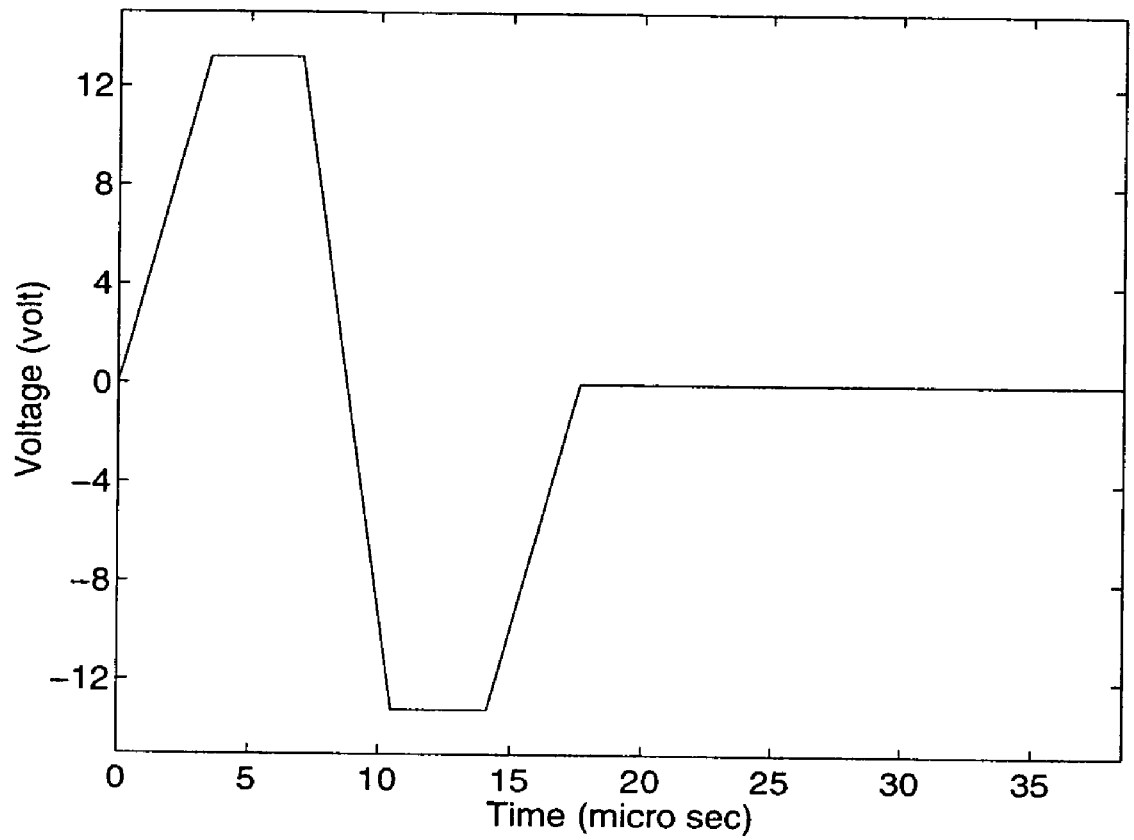
FIG. 7 is a graphical illustration of a typical ink-jet driving voltage with respect to time.
Figure 8:
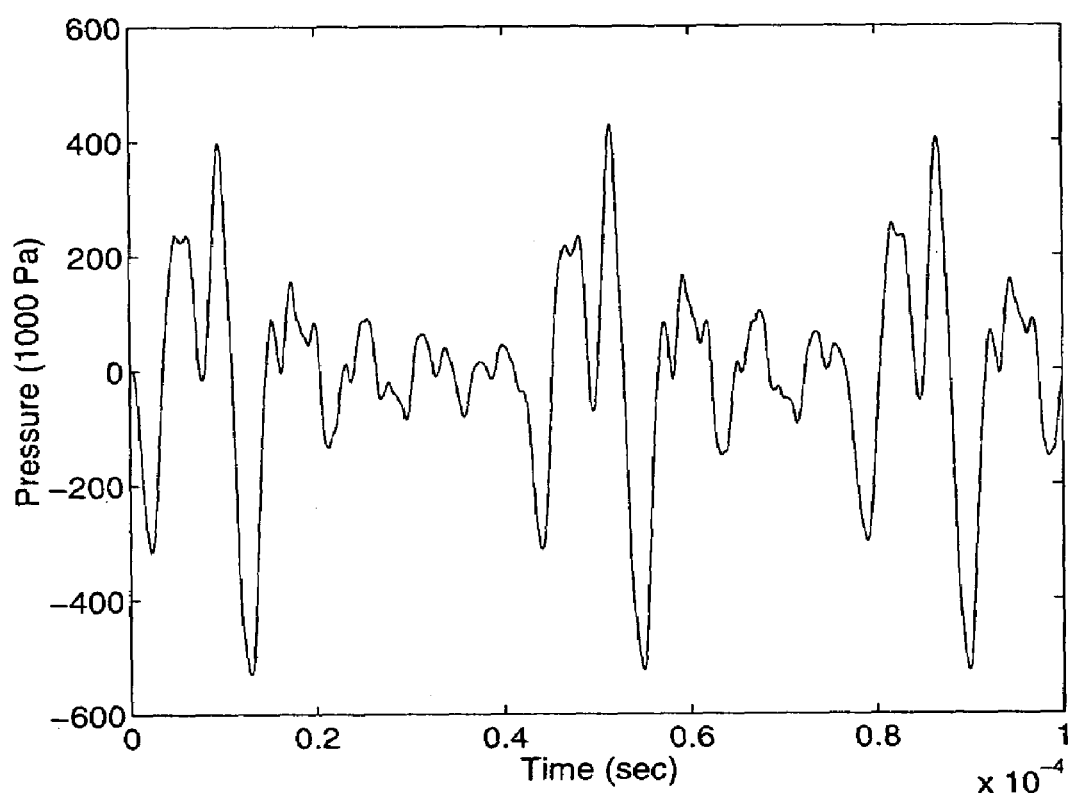
FIG. 8 is a graphical illustration of a typical ink-jet inflow pressure with respect to time.

The inflow pressure is given by an equivalent circuit which simulates the effect of the ink cartridge, supply channel, vibration plate, PZT actuator, applied voltage, and the ink inside the channel and cartridge. In this example, the input voltage is given in FIG. 7, which is repeated at a frequency of 26 KHz. The corresponding inflow pressure is as shown in FIG. 8. The outflow pressure at the top of the solution domain is calculated using the flow diagram of FIG. 6 at the beginning of every time step.

In this example, the solution domain was chosen to be {(r, z)|0≦r≦31.25 μm, 0≦z≦380 μm}. The advancing and receding critical contact angles are 70° and 20°, respectively. The initial meniscus is assumed to be flat and 2.6 microns under the nozzle opening.

Figure 9:
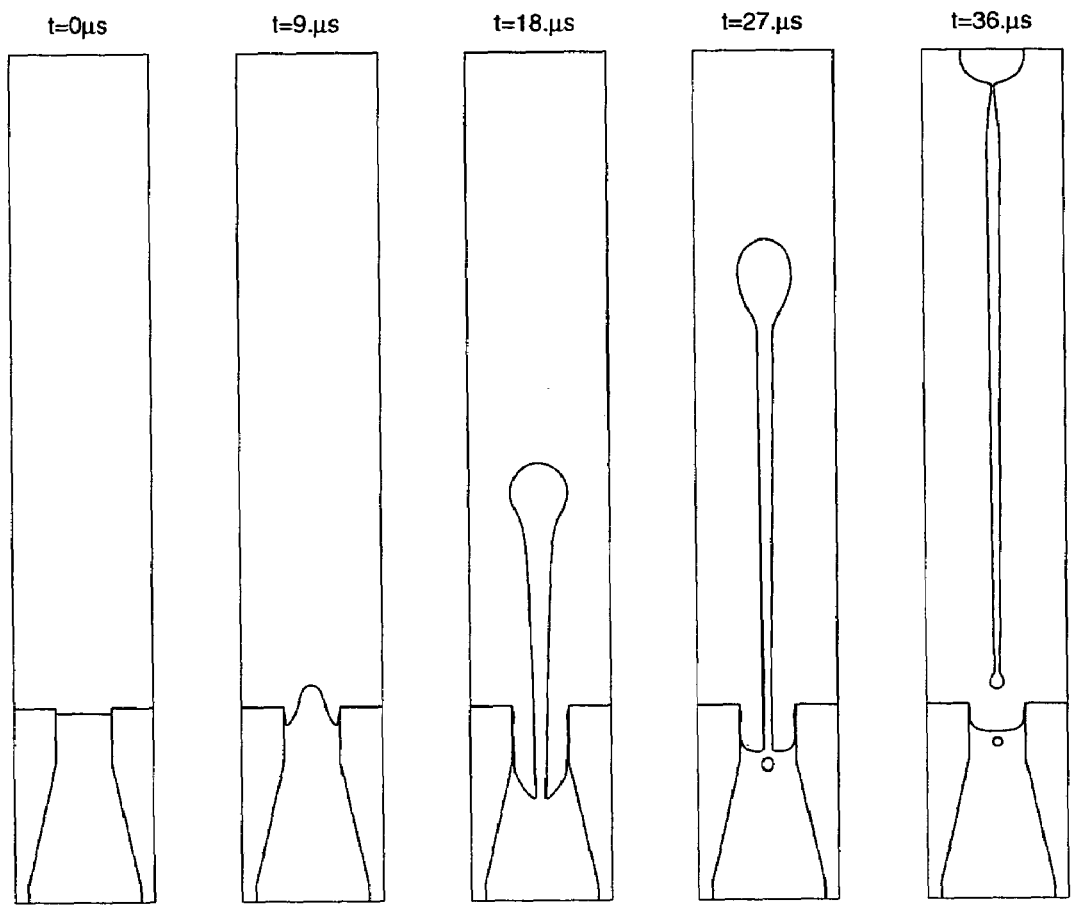
FIG. 9 is a sequence of illustrations depicting the ejection of a large ink droplet from an ink-jet printer from time t=0 μs to t=36 μs.
Figure 10:
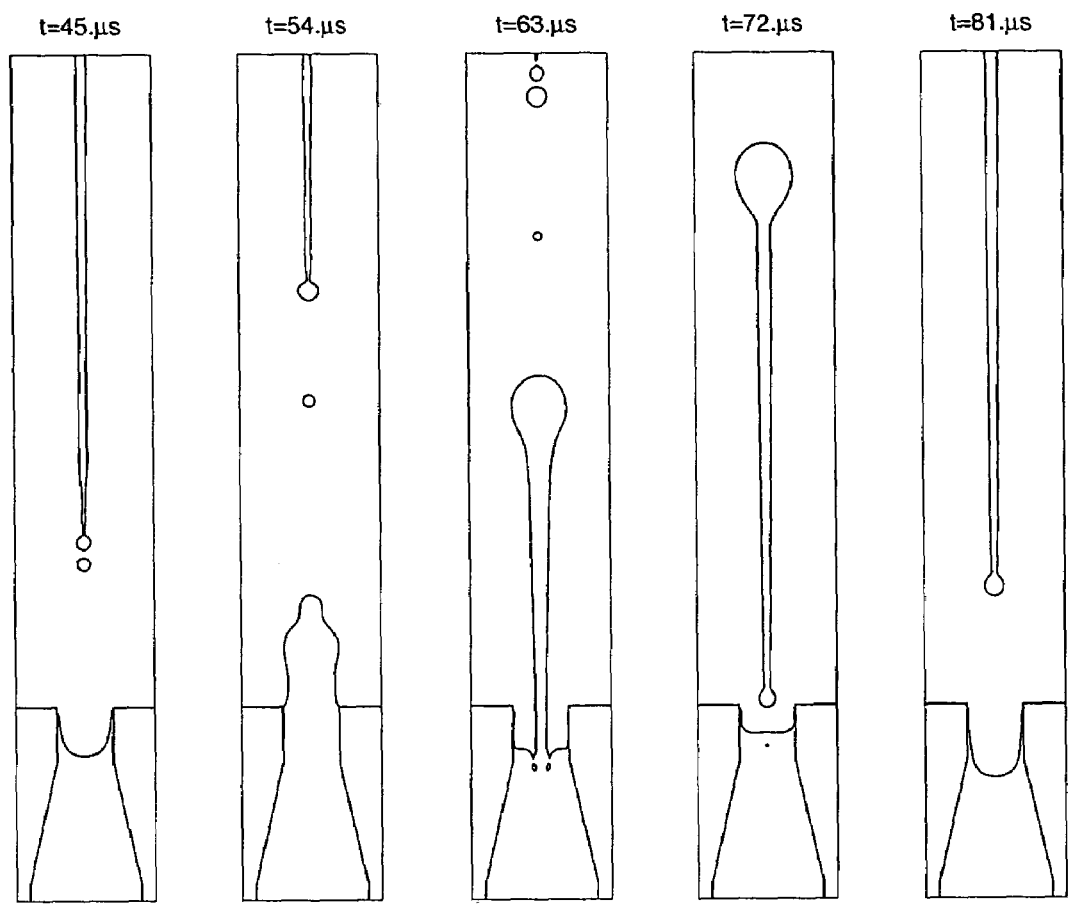
FIG. 10 is a continuation of FIG. 9, showing a sequence of continuing illustrations depicting the ejection of a large ink droplet from an ink-jet printer from t=45 μs to t=81 μs.

For the purpose of normalization, the nozzle opening diameter (25 microns) is selected to be the length scale and 6 m/s is selected to be the velocity scale. The normalized solution domain is hence {(r, z)|0≦r≦1.25, 0≦z≦15.2}. Since the density, viscosity, and surface tension of ink are approximately as given in equations (18), the non-dimensional parameters of equations (19) are obtained. Simulation results are shown in FIGS. 9 and 10. The ink droplet is pinched off inside the nozzle after t=30 μs. Its tail exits the nozzle opening at t=35 μs. FIG. 9 shows that the first droplet passes through the end of the solution domain without causing any stability problem. The droplet then separates into a major droplet and several satellites. FIG. 10 shows the second droplet is then ejected and passes through the end of the solution domain.

It is interesting to see that some air bubbles are created in the nozzle, as shown at t=27, 36, 63 and 72 μs. Due to the non-perfect mass conservation performance of the level set method, these air bubbles get smaller and smaller and finally disappear. Similarly, the satellites at the tail of the long droplet (see the results at t=45, 54 and 63 μs) also become smaller as the simulation progresses. However, these tiny mass losses do not influence the general accuracy of the simulation.

VI. Implementations and Effects

This invention provides improvements to the simulation models and algorithms of related application Ser. No. 10/390,239, now U.S. Pat. No. 7,117,138, by introducing a consistent back pressure calculation to eliminate the instability that occurs as the head of a droplet reaches the end of the solution domain during simulation.

Figure 11:
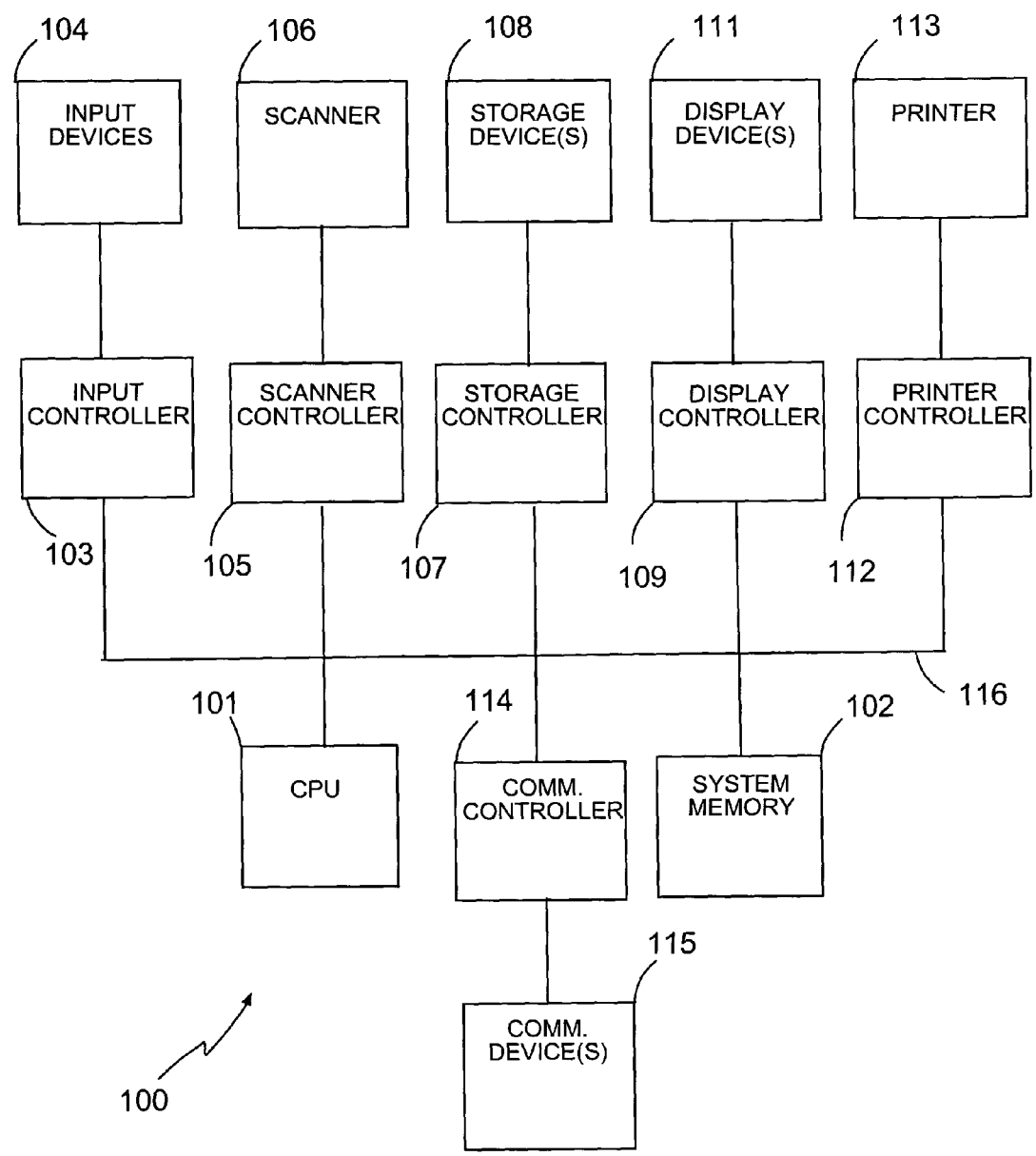
FIG. 11 is a block diagram illustrating an exemplary system which may be used to implement aspects of the present invention.

Having described the details of the invention, an exemplary system 100 which may be used to implement one or more aspects of the present invention will now be described with reference to FIG. 11. As illustrated in FIG. 11, the system includes a central processing unit (CPU) 101 that provides computing resources and controls the computer. CPU 101 may be implemented with a microprocessor or the like, and may also include a graphics processor and/or a floating point coprocessor for mathematical computations. System 100 further includes system memory 102 which may be in the form of random-access memory (RAM) and read-only memory (ROM).

A number of controllers and peripheral devices are also provided, as shown in FIG. 11. Input controller 103 represents an interface to various input devices 104, such as a keyboard, mouse or stylus. There is also a controller 105 which communicates with a scanner 106. A storage controller 107 interfaces with one or more storage devices 108 each of which includes a storage medium such as magnetic tape or disk, or an optical medium that may be used to record programs of instructions for operating systems, utilities and applications which may include embodiments of programs that implement various aspects of the present invention. Storage device(s) 108 may also be used to store processed or data to be processed in accordance with the invention. A display controller 109 provides an interface to a display device 111 which may be a cathode ray tube (CRT) or thin film transistor (TFT) display. A printer controller 112 is also provided for communicating with a printer 113. A communications controller 114 interfaces with one or more communication devices 115 which enables system 100 to connect to remote devices through any of a variety of networks including the Internet, a local area network (LAN), a wide area network (WAN), or through any suitable electromagnetic carrier signals including infrared signals.

In the illustrated system, all major system components connect to bus 116 which may represent more than one physical bus. However, various system components may or may not be in physical proximity to one another. For example, input data and/or output data may be remotely transmitted from one physical location to another. Also, programs that implement various aspects of this invention may be accessed from a remote location (e.g., a server) over a network. Such data and/or programs may be conveyed through any of a variety of machine-readable medium including magnetic tape or disk or optical discs.

The present invention may be conveniently implemented with software. However, alternative implementations are certainly possible, including a hardware and/or a software/hardware implementation. Any hardware-implemented functions may be realized using ASIC(s), digit signal processing circuitry, or the like. With these implementation alternatives in mind, it is to be understood that the figures and accompanying description provide the functional information one skilled in the art would require to write program code (i.e., software) or to fabricate circuits (i.e., hardware) to perform the processing required.

While the invention has been described in conjunction with several specific embodiments, further alternatives, modifications, variations and applications will be apparent to those skilled in the art in light of the foregoing description. Thus, the invention described herein is intended to embrace all such alternatives, modifications, variations and applications as may fall within the spirit and scope of the appended claims.

APPENDIX $$\nabla \cdot u = 0, \quad (1)$$

$$\frac{\partial u}{\partial t} + (u \cdot \nabla)u = -\frac{1}{\rho(\phi)}\nabla p + \frac{1}{\rho(\phi)\text{Re}}\nabla \cdot (2\mu(\phi)D) - \frac{1}{\rho(\phi)\text{We}}\kappa(\phi)\delta(\phi)\nabla\phi, \quad (2)$$

$$D = \frac{1}{2}[\nabla u + (\nabla u)^T], \quad (3)$$

$$\frac{\partial \phi}{\partial t} + u \cdot \nabla \phi = 0, \quad (4)$$

$$\varphi^{n+1} = \varphi^n - \Delta t[u \cdot \nabla \varphi]^{n+1/2}, \quad (5)$$

$$\phi^{n+1/2} = \frac{1}{2}(\phi^n + \phi^{n+1}), \quad (6)$$

$$\frac{u^{n+1} - u^n}{\Delta t} + [(u \cdot \nabla)u]^{n+1/2} = -\frac{1}{\rho(\phi^{n+1/2})}\nabla p^{n+1} + \frac{1}{\rho(\phi^{n+1/2})\text{Re}}\nabla \cdot [2\mu(\phi^{n+1/2})D^n] - \frac{1}{\rho(\phi^{n+1/2})\text{We}}[\kappa(\phi)\delta(\phi)\nabla \phi]^{n+1/2}, \quad (7)$$

APPENDIX-continued $$u^* = u^n + \Delta t\left\{-[(u \cdot \nabla)u]^{n+1/2} + \frac{1}{\rho(\phi^{n+1/2})\text{Re}}\nabla \cdot [2\mu(\phi^{n+1/2})D^n] - \frac{1}{\rho(\phi^{n+1/2})\text{We}}[\kappa(\phi)\delta(\phi)\nabla \phi]^{n+1/2}\right\}, \quad (8)$$

$$u^{n+1} = u^* - \frac{\Delta t}{\rho(\phi^{n+1/2})}\nabla p^{n+1}, \quad (9)$$

$$\nabla \cdot u^* = \nabla \cdot \left(\frac{\Delta t}{\rho(\phi^{n+1/2})}\nabla p^{n+1}\right), \quad (10)$$

$$\int_\Omega u^* \cdot \nabla \psi \, dx = \int_\Omega \frac{\Delta t}{\rho(\phi^{n+1/2})}\nabla p^{n+1} \cdot \nabla \psi \, dx + \int_{\Gamma_1} \psi u^{BC} \cdot n \, dS, \quad (11)$$

$$\frac{\Delta t}{\rho(\phi^{n+1/2})}\frac{\partial p^{n+1}}{\partial n} = (u^* - u^{BC}) \cdot n, \quad (12)$$

$$\frac{\partial u}{\partial t} + (u \cdot \nabla)u = -\frac{1}{\rho(\phi)}\frac{\partial p}{\partial r} + \frac{1}{\rho(\phi)\text{Re}}[\nabla \cdot (2\mu(\phi)D)]e_r - \frac{1}{\rho(\phi)\text{We}}\kappa(\phi)\delta(\phi)\frac{\partial \phi}{\partial r}, \quad (13)$$

$$\frac{\partial p}{\partial r} = \delta(\phi)\left\{\frac{1}{\text{Re}}[\nabla \cdot (2\mu(\phi)D)] \cdot e_r - \frac{1}{\text{We}}\kappa(\phi)\frac{\partial \phi}{\partial r}\right\}, \quad (14)$$

$$p_{i,j}^n = p_{i+1,j}^n + \delta(\phi_{i,j}^n)\left\{-\frac{\Delta r}{\text{Re}}[(\nabla \cdot (2\mu(\phi)D)) \cdot e_r]_{i,j}^n + \frac{1}{2\text{We}}\kappa(\phi^n)(\phi_{i+1,j}^n - \phi_{i-1,j}^n)\right\}, \quad (15)$$

$$[(\nabla \cdot (2\mu(\phi)D)) \cdot e_r]_{i,j}^n = \frac{2}{r_{i,j}\Delta r \Delta r}[\mu(\phi_{i+1/2,j}^n)r_{i+1/2,j}(u_{i+1,j}^n - u_{i,j}^n) - \mu(\phi_{i-1/2,j}^n)r_{i-1/2,j}(u_{i,j}^n - u_{i-1,j}^n)] - 2\mu(\phi_{i+1,j}^n)\frac{u_{i,j}^n}{r_{i,j}^2}, \quad (16)$$

$$\frac{\partial p}{\partial r} = \delta(\phi)\left\{\frac{g}{J\text{Re}}[T^T \cdot \nabla_\Xi \mu(\phi)] \cdot [gJ^{-1}T^T\nabla_\Xi u + (gJ^{-1}T^T\nabla_\Xi u)^T] + \frac{\mu(\phi)}{J\text{Re}}\nabla_\Xi \cdot [g^2J^{-1}TT^T\nabla_\Xi u] + \frac{\mu(\phi)}{\text{Re}}\left(0 - \frac{u}{r^2}\right) - \frac{1}{\text{We}}\kappa(\phi)gJ^{-1}T^T\nabla_\Xi \phi\right\} \cdot e_r \quad (17)$$

$$\rho_1 = 1070 \text{ Kg/m}^3, \mu_1 = 3.7 \times 10^{-3} \text{ Kg/m} \cdot \text{sec}, \sigma = 0.032 \text{ Kg/sec}^2, \quad (18)$$
$$\text{Re} = 43.4, \text{We} = 30.1. \quad (19)$$

What is claimed is:

1. A method for simulating and analyzing fluid flow through, and ejection from, a channel having a boundary between a first fluid that flows through the channel and a second fluid, the method comprising the steps of:

(a) performing finite difference analysis including solving, with reference to both a quadrilateral grid in a physical space and a uniform square grid in a computational space, equations governing the flow of the first fluid through the channel, wherein the partial differential equations were first derived for the quadrilateral grid in the physical space and then transformed to the computational space for application on the uniform square grid, the performing of the finite difference analysis further including calculating a back pressure boundary condition with reference to the quadrilateral grid to overcome instability as a head of a droplet of the first fluid approaches the end of the solution domain;

(b) simulating the flow of the first fluid through, and ejection from, the channel based on the performed finite difference analysis; and (c) storing the results of the simulation.

2. The method of claim 1, wherein the first fluid is ink, the second fluid is air, and the channel comprises an ink-jet nozzle that is part of a piezoelectric ink-jet head.

3. A method for simulating and analyzing fluid flow through, and ejection from, a channel having a boundary between a first fluid that flows through the channel and a second fluid, the method comprising the steps of:

(a) deriving partial differential equations applicable to a quadrilateral grid in a physical space, including deriving a viscosity term, a surface tension term, and a level set convection equation for two-phase flows;

(b) calculating a transformation for transforming the derived partial differential equations for application to a uniform square grid in a computational space;

(c) calculating a back pressure boundary condition with reference to the quadrilateral grid to overcome instability as a head of a droplet of the first fluid approaches the end of the solution domain;

(d) solving the derived and transformed partial differential equations to determine the flow of the first fluid through, and ejection from, the channel; and (e) storing the solutions to the derived and transformed partial differential equations.

4. The method of claim 3, wherein in step (d) the derivatives of velocity, pressure, and level set for the flow of the first fluid in the derived and transformed partial differential equations are calculated with reference to the uniform square grid in the computational space.

5. The method of claim 3, wherein the first fluid is ink, the second fluid is air, and the channel comprises an ink-jet nozzle that is part of a piezoelectric ink-jet head.

6. An apparatus for simulating and analyzing fluid flow through, and ejection from, a channel having a boundary between a first fluid that flows through the channel and a second fluid, the apparatus comprising:

means for performing finite difference analysis including solving, with reference to both a quadrilateral grid in a physical space and a uniform square grid in a computational space, equations governing the flow of the first fluid through the channel, wherein the partial differential equations were first derived for the quadrilateral grid in the physical space and then transformed to the computational space for application on the uniform square grid, the performing of the finite difference analysis further including calculating a back pressure boundary condition with reference to the quadrilateral grid to overcome instability as a head of a droplet of the first fluid approaches the end of the solution domain; and means for simulating the flow of the first fluid through, and ejection from, the channel based on the performed finite difference analysis; and means for storing the results of the simulation.

7. The apparatus of claim 6, wherein the performing means comprises a program of instructions embodied in software, hardware, or combination thereof.

8. The apparatus of claim 6, wherein the simulating means comprises a display for visually observing the simulation.

9. The apparatus of claim 6, wherein the first fluid is ink, the second fluid is air, and the channel comprises an ink-jet nozzle that is part of a piezoelectric ink-jet head.

10. An apparatus for simulating and analyzing fluid flow through, and ejection from, a channel having a boundary between a first fluid that flows through the channel and a second fluid, the apparatus comprising:

means for deriving partial differential equations applicable to a quadrilateral grid in a physical space, including deriving a viscosity term, a surface tension term, and a level set convection equation for two-phase flows;

means for calculating a transformation for transforming the derived partial differential equations for application to a uniform square grid in a computational space;

means for calculating a back pressure boundary condition with reference to the quadrilateral grid to overcome instability as a head of a droplet of the first fluid approaches the end of the solution domain;

means for solving the derived and transformed partial differential equations to determine the flow of the first fluid through, and ejection from, the channel; and means for storing the solutions to the derived and transformed partial differential equations.

11. The apparatus of claim 10, wherein the solving means calculates, with reference to the uniform square grid in the computational space, the derivatives of velocity, pressure, and level set for the flow of the first fluid in the derived and transformed partial differential equations.

12. The apparatus of claim 10, wherein the first fluid is ink, the second fluid is air, and the channel comprises an ink-jet nozzle that is part of a piezoelectric ink-jet head.

13. A machine-readable medium having a program of instructions for directing a machine to perform a method for simulating and analyzing fluid flow through, and ejection from, a channel having a boundary between a first fluid that flows through the channel and a second fluid, the program of instructions comprising instructions for:

(a) performing finite difference analysis including solving, with reference to both a quadrilateral grid in a physical space and a uniform square grid in a computational space, equations governing the flow of the first fluid through the channel, wherein the partial differential equations were first derived for the quadrilateral grid in the physical space and then transformed to the computational space for application on the uniform square grid, the performing of the finite difference analysis further including calculating a back pressure boundary condition with reference to the quadrilateral grid to overcome instability as a head of a droplet of the first fluid approaches the end of the solution domain;

(b) simulating the flow of the first fluid through, and ejection from, the channel based on the performed finite difference analysis; and (c) storing the results of the simulation.

14. The machine-readable medium of claim 13, wherein the first fluid is ink, the second fluid is air, and the channel comprises an ink-jet nozzle that is part of a piezoelectric ink-jet head.

15. A machine-readable medium having a program of instructions for directing a machine to perform a method for simulating and analyzing fluid flow through, and ejection from, a channel having a boundary between a first fluid that flows through the channel and a second fluid, the program of instructions comprising instructions for:

(a) deriving partial differential equations applicable to a quadrilateral grid in a physical space, including deriving a viscosity term, a surface tension term, and a level set convection equation for two-phase flows;

(b) calculating a transformation for transforming the derived partial differential equations for application to a uniform square grid in a computational space;

(c) calculating a back pressure boundary condition with reference to the quadrilateral grid to overcome instability as a head of a droplet of the first fluid approaches the end of the solution domain; and (d) solving the derived and transformed partial differential equations to determine the flow of the first fluid through, and ejection from, the channel; and (e) storing the solutions to the derived and transformed partial differential equations.

16. The machine-readable medium of claim 15, wherein in instructions (d) the derivatives of velocity, pressure, and level set for the flow of the first fluid in the derived and transformed partial differential equations are calculated with reference to the uniform square grid in the computational space.

17. The machine-readable medium of claim 15, wherein the first fluid is ink, the second fluid is air, and the channel comprises an ink-jet nozzle that is part of a piezoelectric ink-jet head.

* * * * *